Patented June 30, 1931

1,812,321

UNITED STATES PATENT OFFICE

JOSEPH G. DAVIDSON, OF YONKERS, NEW YORK, ASSIGNOR TO CARBIDE AND CARBON CHEMICALS CORPORATION, A CORPORATION OF NEW YORK

FINISH REMOVER

No Drawing.   Application filed February 26, 1927.   Serial No. 171,383.

The invention relates to solvents adapted to remove from wood, metal and other solid materials, films or coatings deposited thereon for ornamentation or protection. Examples of such films are those which result from painting, varnishing, lacquering, enameling or waxing. The film usually contains a natural or synthetic gum, resin, wax or oil, or an oxidation product of other derivative thereof, or a cellulose derivative such as nitrocellulose; and it may contain pigment, dye, or other auxiliary substance. Compositions of the class to which the invention belongs are ordinarily called "finish removers" or simply "paint removers".

The prime requisite in a finish remover is a solvent which will act upon and dissolve a large proportion of the finish films likely to be encountered. The utility of the preparation is of course greater the more rapid its solvent action on finishes. In addition the solvent should be reasonably cheap, compatible with auxiliary agents useful in such compositions, and non-injurious to users of the composition or the materials from which the finish is to be removed.

In compounding finish removers it has been found that the solvents otherwise most nearly meeting the requirements are usually more volatile than is desirable, and it has usually been necessary to incorporate a material, such as paraffine, to prevent too rapid evaporation. Such evaporation deterrent usually has little or no solvent action of its own, and it may impair the dissolving power of the solvent. In addition the evaporation deterrent often leaves a greasy or waxy film on the surface which interferes with the application of a new finish.

I have discovered that the polyglycols and their mono or di ethers, either alkyl or aryl, have properties which well adapt them for use in finish removers. Their ability to dissolve finish films is excellent, and they evaporate much less rapidly than the solvents (such as the lower ketones) which have heretofore been most generally used. The residual liquid may be completely removed from the surface by wiping and evaporation, and unlike paraffine and other waxy evaporation deterrents leaves no interfering film on the surface. The use of the solvents of my invention makes it unnecessary to use waxes and the like in detrimental proportions. Many of the compounds of the invention form excellent solvent mixtures with more volatile solvents, the mixture by virtue of its content of polyglycol or ether thereof being sufficiently non-volatile.

The polyglycols may be regarded as condensation products of the glycols, two or more molecules of the latter combining with the elimination of water. The simplest polyglycol is diethylene glycol

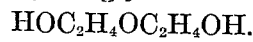

The condensation of three molecules of ethylglycol is diethylene glycol

and so with the higher polyglycols. Propylene, butylene and the higher glycols form similar series, and mixed glycols, for example ethylene propylene glycol

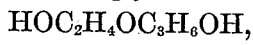

are also formed under suitable conditions.

An alkyl or aryl group can be introduced into either or both of the hydroxyl groups forming ethers, it being understood that the polyglycols themselves may be regarded as ether-alcohols. In general the mono ethers are more active solvents than the di ethers, presumably because of the residual hydroxyl group in the mono ethers.

The boiling points of typical compounds embraced within the invention are as follows:

|  | Deg. C. |
|---|---|
| Diethylene glycol | 245 |
| Triethylene glycol | 276 |
| Monoethyl ether of diethylene glycol | 198 |
| Monoethyl ether of triethylene glycol | 248 |
| Monobutyl ether of diethylene glycol | 235 |

Methods for preparing the ethers of the polyglycols are described in my application Ser. No. 44,930 filed July 20, 1924.

The type formula for the compounds comprised in the invention is

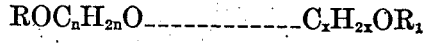

where R and $R_1$ are alkyl or aryl groups or hydrogen and $n$ and $x$ are integers greater than 1. The dotted line in the formula indicates either a simple bond or a divalent radicle. The mono ethers of the polyglycols are excellent finish removers, the monoalkyl ethers of the di- and triethylene glycols being preferred.

I claim:

1. In a process of removing finish coatings from surfaces, the step of disintegrating the coating by attacking an organic constituent thereof by applying thereto a solvent containing a compound of the type formula $$ROC_nH_{2n}O\text{------------}C_xH_{2x}OR_1$$

where R and $R_1$ are alkyl or aryl groups or hydrogen; $n$ and $x$ are integers greater than 1; and the dotted line is a simple bond or a divalent radicle.

2. In a process of removing finish coatings from surfaces, the step of disintegrating the coating by attacking an organic constituent thereof by applying thereto a solvent containing a compound of the type formula $$HOC_nH_{2n}O\text{------------}C_xH_{2x}OR$$

where R is an alkyl or aryl group; $n$ and $x$ stand for "2" or "3"; and the dotted line is a simple bond, $C_2H_4O$, or $C_3H_6O$.

3. In a process of removing finish coatings from surfaces, the step of disintegrating the coating by attacking an organic constituent thereof by applying thereto a solvent containing a compound of the type formula $$ROC_2H_4O\text{----------}C_2H_4OR_1$$

where R and $R_1$ are alkyl or aryl groups or hydrogen; and the dotted line is a simple bond or a divalent radicle.

In testimony whereof, I affix my signature.

JOSEPH G. DAVIDSON.